United States Patent [19]

Tang et al.

[11] Patent Number: 4,932,379
[45] Date of Patent: Jun. 12, 1990

[54] METHOD FOR DETECTING ENGINE MISFIRE AND FOR FUEL CONTROL

[75] Inventors: Dah-Lain Tang, Canton; Man-Feng Chang; Myrna C. Sultan, both of Troy, all of Mich.

[73] Assignee: General Motors Corporation, Detroit, Mich.

[21] Appl. No.: 345,807

[22] Filed: May 1, 1989

[51] Int. Cl.⁵ .......................................... F02D 41/04
[52] U.S. Cl. ................................ 123/436; 73/117.3; 123/491
[58] Field of Search .................. 123/179 L, 419, 436, 123/481, 491; 73/117.3; 364/431.07

[56] References Cited
U.S. PATENT DOCUMENTS 4,366,793  1/1983  Coles ................................. 123/436
4,372,269  2/1983  Coles ................................. 123/436
4,691,286  9/1987  Obayashi et al. ............... 123/436 X
4,697,561  10/1987 Citron ............................. 123/436 X Primary Examiner—Tony M. Argenbright
Attorney, Agent, or Firm—Howard N. Conkey

[57] ABSTRACT

Misfire is detected in an internal combustion engine during its starting mode by analyzing the engine speed profile. Average speed is determined for 60° increments of crankshaft rotation. If an increment midway between top dead center positions has a higher speed than the previous increment and a higher speed than cranking speed, combustion occurred, otherwise a misfire occurred. When misfires are detected for a particular cylinder the calculated fuel allotment for that cylinder is reduced in accordance with the number of consecutive misfires for that cylinder.

7 Claims, 4 Drawing Sheets

METHOD FOR DETECTING ENGINE MISFIRE AND FOR FUEL CONTROL

FIELD OF THE INVENTION

This invention relates to a method of detecting misfires during starting of an internal combustion spark fired engine and particularly to such a method useful for engine diagnostics and for engine fuel control.

BACKGROUND OF THE INVENTION

It has previously been proposed to detect engine misfire by direct sensing of the gas mixture through optical means or pressure signals. It is also known to use engine speed in one cylinder firing event compared with that of another cylinder event to define combustion variation or engine roughness. Engine speed has also been used by employing a very high resolution engine position encoder to yield hundreds of speed data points in each engine revolution and circuitry for detecting the maximum and minimum speeds, and deducing misfire from them. In the present disclosure it will be shown that low resolution engine speed information on the order of six data points per engine revolution can be used to detect misfire and combustion in individual cylinders. Moreover, the misfire can be determined before the combustion stroke is completed. It will further be shown that the combustion and misfire information can be used, not only for diagnostic purposes, but also for fuel control during cranking to enhance the ease of starting an engine, which is especially desirable in cold weather.

The fuel control will utilize a two pulse fuel injection technique of injecting a first pulse during the exhaust stroke of the engine and a second pulse during the subsequent intake stroke. The second pulse is varied on the basis of recent engine operation information to optimize the fuel input. This already known technology can take into account the rate of air intake and other variables, but heretofore has not been able to accommodate the effects of engine misfire. Misfire has the effect of leaving in the cylinder some of the fuel vapor so that the continued addition of standard amounts of fuel in subsequent combustion cycles causes the air/fuel mixture to become too rich, even to the point of flooding the engine. Combustion, on the other hand, results in a residue of burned gases in a cylinder and requires a different amount of fuel than one which has not experienced combustion.

SUMMARY OF THE INVENTION

It is therefore an object of the invention to provide a method of detecting misfire and combustion. It is a further object to provide a fuel control method using misfire and combustion information for calculating the optimum fuel charge for each cylinder.

The invention is carried out by the method of detecting misfire in an internal combustion engine during start up comprising the steps of: sensing first engine speeds at positions midway between top dead center positions and second engine speeds at positions between each midway position and the previous top dead center position, during initial cranking, storing first speeds as cranking speed, and comparing the first speed with the second speed during the combustion period of each cylinder and with the cranking speed whereby a failure to increase speed over the cranking speed and over the second speed denotes misfire for that cylinder.

The invention is further carried out by the method of controlling fuel during engine cranking on the basis of misfire information comprising the steps of: sensing first engine speeds at positions midway between top dead center positions and second engine speeds at positions between each midway position and the previous top dead center position, during initial cranking, storing first speeds as cranking speed, comparing the first speed with the second speed during the combustion period of each cylinder and with the cranking speed whereby a failure to increase speed over the cranking speed and over the second speed denotes misfire for that cylinder while a speed increase denotes combustion for that cylinder, measuring manifold pressure, calculating a fuel injection amount for each cylinder from the measured pressure and engine speed, and adjusting the fuel amount in response to the misfire history of the cylinder.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The description of the invention is couched in terms of a four cylinder spark ignited engine but it applies as well to six or eight cylinder engines. The misfire detection scheme has broad application to many engines while the fuel control aspect works best for sequential port fuel injection systems because of the fine control of individual cylinder injection possible with such a fuel system.

The method relies on the cyclical nature of the engine speed within each combustion cycle. For a four cylinder engine two cylinders reach top dead center (TDC) at the same time and the other two are at bottom dead center. Ordinarily the speed is lowest at the top dead center and reaches a local peak about midway between the TDC points. This is shown in the top curve of FIG. 1 where the TDC positions are marked with a T and are spaced by 180° of crankshaft rotation angle. Finer increments are marked at a spacing of 60°. The increments midway between the TDC positions generally have an average engine speed higher than the increments adjacent the TDC position. This average speed is charted in the second line of FIG. 1. During cranking and before combustion occurs the speed waveform exhibits regular periodicity with the average speed peaks identified as a, b and c. A similar pattern holds when combustion takes place but the peak speeds are higher than during cranking as illustrated by speeds e and g. A peak is identified by comparing the midway increment speed with the average speed measured for the previous increment;

thus e>d and g>f when a peak occurs. A misfire, however, presents another pattern where the speed j is not a peak but is the same as or lower than the speed h in the previous adjacent interval unless the engine is at cranking speed as at k.

From the above observations an algorithm for detecting misfire can be derived. If the speed at the midway interval between TDC positions (120° BTDC to 60° BTDC) is above cranking speed and it is also higher than the speed for the previous adjacent period (180° BTDC to 120° BTDC) combustion has occurred. Otherwise the engine is at cranking speed or a misfire has occurred. For fuel control purposes operation at cranking speed after an initial cranking period is called a misfire. For diagnostic purposes a distinction may be made between failure to fire at cranking speed and at a higher speed For the conditions illustrated in FIG. 1, the cranking speed is a. Misfires are indicated by b and c since they are not above cranking speed. A misfire is detected at j because j<h. Combustion is detected at e because e>L a and e>d. Similarly, combustion is detected at g because g>a and g>f.

Figure 2:
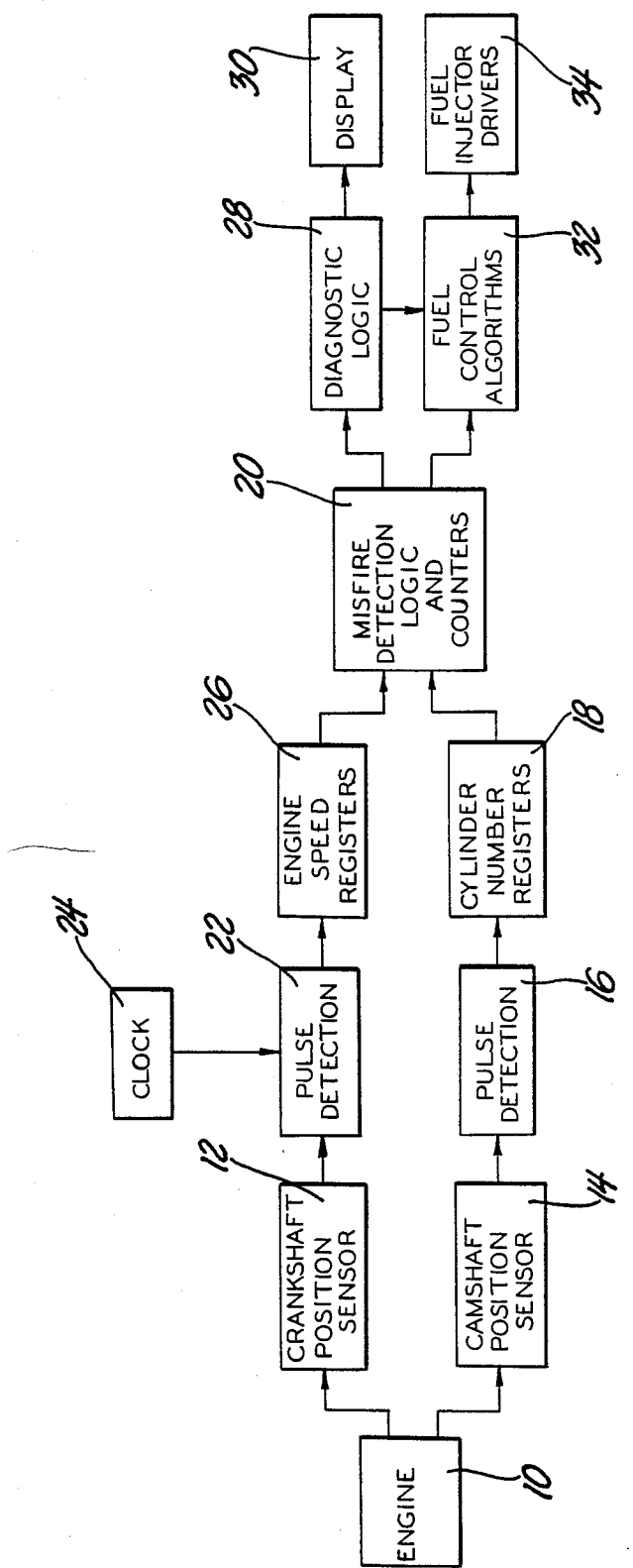
FIG. 2 is a block diagram of a system for carrying out the method of the invention.

FIG. 2 is a block diagram of apparatus for engine control and diagnostics utilizing misfire detection. An engine 10 has a crankshaft position sensor 12 for issuing a reference pulse at each TDC and at subsequent 60° intervals of crankshaft rotation. A camshaft position sensor 14 generates pulses identifying individual cylinders. A pulse detector 16 receives the pulses from the camshaft position sensor and triggers a cylinder number register 18 which keeps track of which cylinder is in its combustion period. That information is fed to misfire detection logic and counter circuit 20. Pulse detector 22 receives the reference pulses from the crankshaft position sensor 12 and gates clock pulses from a clock 24 thereby outputting trains of clock pulses representing the average speed of the engine during the interval marked by the reference pulses. The clock pulses are counted by the engine speed register 26 and that information is stored in the circuit 20 where it is correlated with the cylinder number. The misfire detection is carried out on the basis of the received speed signals in accordance with the misfire detection algorithm. The information can be used by on-board diagnostic circuits 28 which output information to a display 30 indicating problems in the engine. The diagnostic circuit may, for example, determine that a particular cylinder does not fire at all during the start-up mode, thereby indicating a significant hardware problem such as a faulty spark plug wire or spark coil or insufficient or excessive fuel injected to that cylinder. If, on the other hand, the cylinder fires part of the time the fuel supply is more likely to be the cause of the problem. A fuel control algorithm circuit 32 determines the amount of fuel to inject into each cylinder and controls the fuel injector drivers 34.

Figure 3:
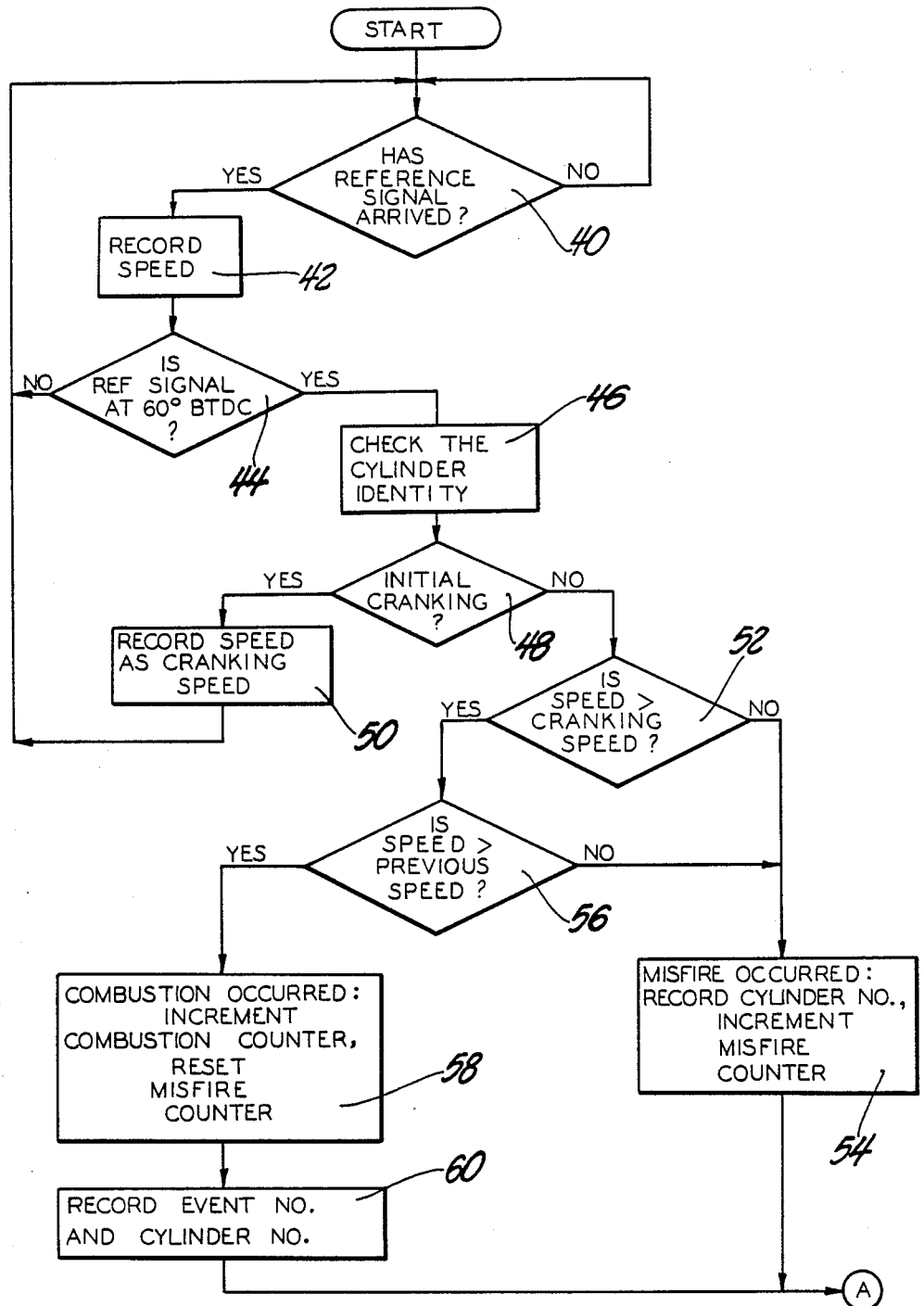
FIG. 3 is a flow chart showing the method of detecting misfire according to the invention.

The flow chart of FIG. 3 shows the method of detecting misfires as well as accumulating other information which may be useful for diagnostic purposes. Numerals in angle brackets refer to the blocks of the flow chart. After START, the circuit waits for a reference pulse to arrive <40> and the average speed of the engine during the interval closed by the reference pulse is recorded <42>. If the reference signal occurs at 60° BTDC <44> it means that the speed for the period midway between two TDC's has just been measured and more operations on this information are required. If not, the process returns to START to wait for another reference pulse. If the speed for the midway period has been measured the identity of the cylinder in its combustion period is checked <46>. Next it is determined if the engine is in its initial cranking mode <48>, which is conveniently determined by the angular crankshaft movement since starting was initiated. Preferably, the first 180° of crankshaft rotation is used for the initial cranking mode since combustion can not have occurred so soon and it is desired to register a cranking speed in the absence of any combustion activity. If the engine is in the initial cranking mode the measured speed (corresponding to a in FIG. 1) is recorded as the cranking speed. If not in the cranking mode the speed just measured is compared to the recorded cranking speed <52>. If it is not greater than cranking speed by a small margin (10-20 rpm) a misfire occurred <54> and the cylinder number is recorded and the misfire counter is incremented. If the speed is greater than cranking speed by the small margin, the speed is then compared to the previous speed just measured in the same combustion cycle <56>. If it is not greater than the previous speed a misfire occurred <54> but if it is greater than the previous speed then combustion has occurred <58> and the combustion counter is incremented and the misfire counter is reset. Finally the event number and cylinder number are recorded. The event number is the combustion period numbered from the beginning of the starting operation. This information as well as the combustion count can be used by the diagnostic circuit 28. For purposes of the fuel algorithm the combustion event may just as well be stored as a flag since the number of combustion events is not of concern in the fuel calculation.

It will be seen that the cranking speed, based on direct measurement, is empirically established before combustion occurs. Because of varying battery conditions and ambient temperatures, the cranking speed can vary considerably. Thus the direct measurement of cranking speed is a distinct advantage to the system operation because a comparison to cranking speed is one of the vital aspects of the algorithm.

Figure 1:
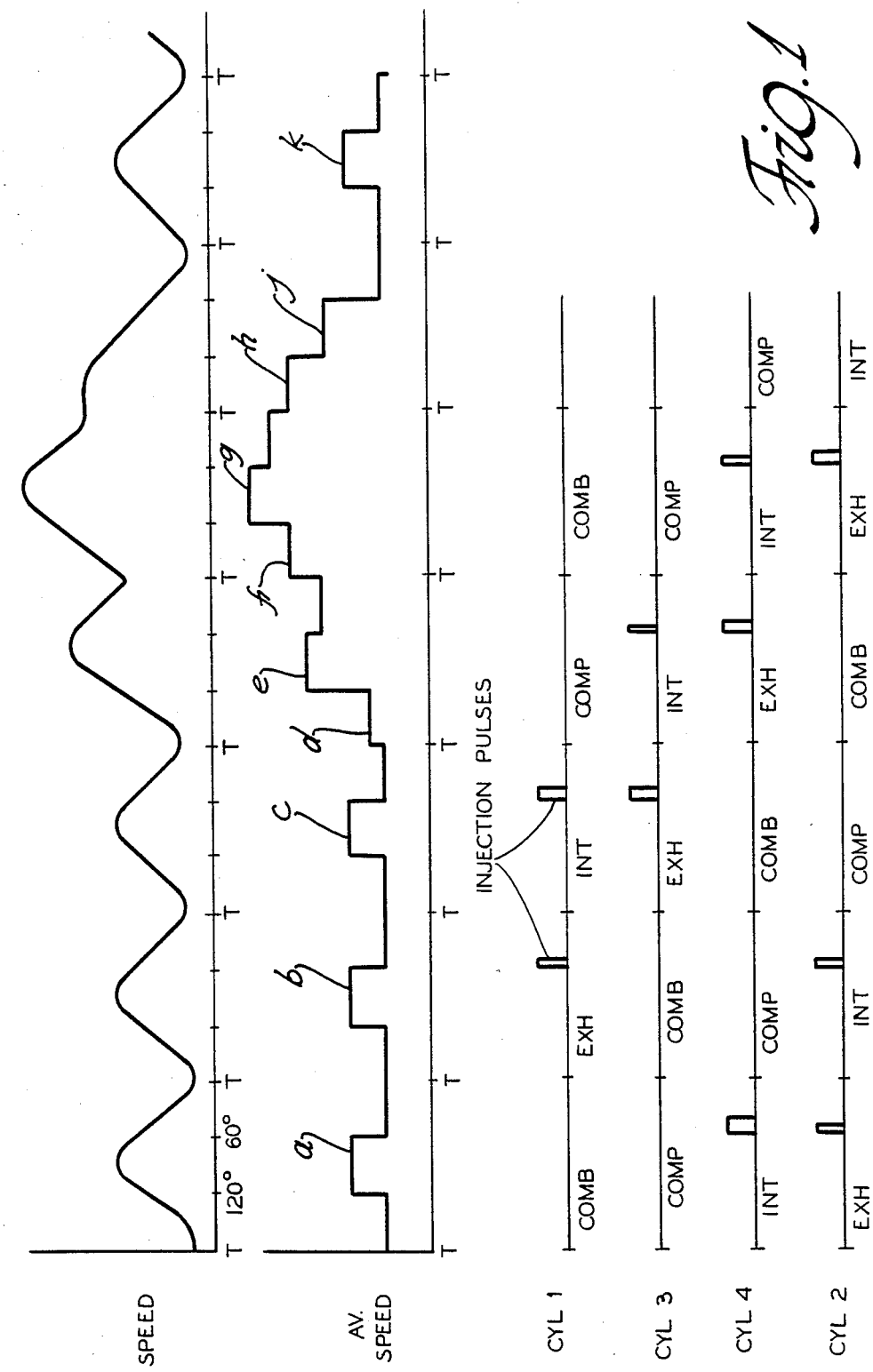
FIG. 1 is a diagram of engine speed during starting with average engine speed for each crankshaft interval and fuel injection timing illustrating the basis for misfire detection and fuel control according to the invention.

The fuel injection scheme is illustrated in the lower four lines of FIG. 1. Each line is for a different cylinder and shows its intake, compression, combustion and exhaust periods. The fuel is injected into each cylinder in two parts. The first injection pulse occurs in the exhaust cycle just prior to the opening of the intake valve. The second pulse occurs in the intake period prior to valve closing. This allows the most recent information to be used in determining the optimum total fuel for that cylinder at that time. The injections occur at a certain angle, e.g. 60° BTDC, and two cylinders are injected at the same time so that, for example, the second fuel pulse in cylinder 3 is synchronous with the first fuel pulse in cylinder 4. The pulses are controlled independently so that they may have different widths. During initial cranking when little information on fuel requirements is available, a preset cranking fuel pulse width is used. As more information is gathered the preset pulse width can be modified. When a cylinder misfires fuel vapor accumulates in the cylinder so that subsequent injection should add smaller amounts of fuel to avoid flooding. Thus the number of misfires in the counter directly affects the best fuel amount for each cycle and each cylinder. An empirical look-up table is developed for a particular engine to establish the desired fuel pulse width as a function of the number of consecutive misfires. This information is used to adjust the preset cranking fuel pulse width. After a cylinder has had a combustion event the fuel amount is calculated on the basis of engine speed and intake manifold pressure. This calculated fuel pulse width is similarly decreased according to a table if misfires have occurred for that cylinder after the combustion occurred.

Figure 4:
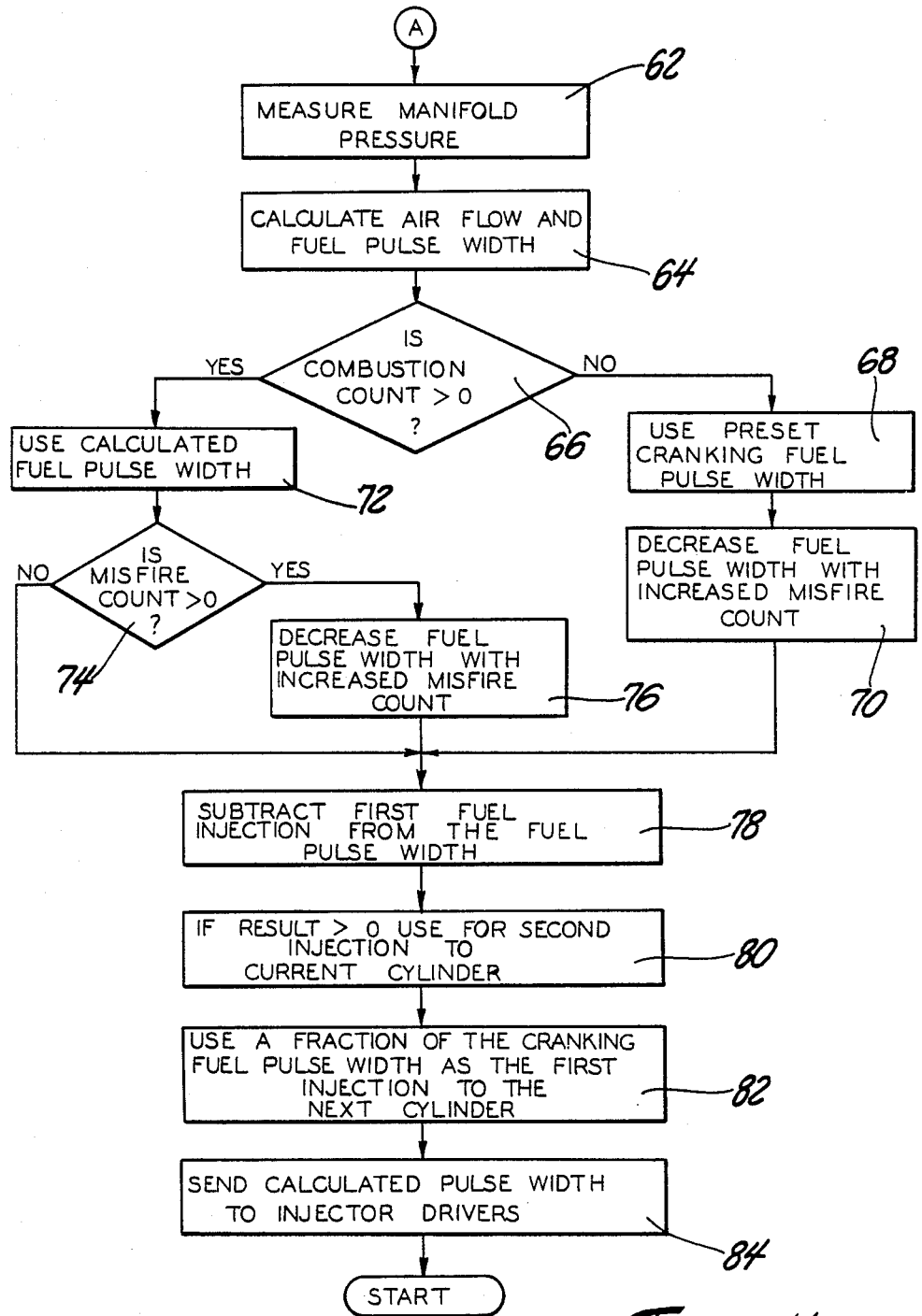
FIG. 4 is a flow chart showing the fuel control method according to the invention.

The counter and cylinder number information are input to the fuel control flow chart of FIG. 4 at node A. The first pulse will already have been injected into the current cylinder. The size of the second pulse, if any, must then be determined. To determine the total amount of fuel that should be injected into each cylinder the intake manifold pressure is measured <62> and air flow is calculated <64> on the basis of engine speed and manifold pressure. Then the fuel pulse width is calculated <64> for optimum fuel/air ratio. If the combustion count is zero <66> the preset cranking fuel pulse width is used <68> and that pulse width is decreased <70> in accordance with the number of misfires for that cylinder. If the combustion count is greater than zero the calculated fuel pulse width is used <72>. If the misfire count is greater than zero <74> the calculated pulse is reduced <76> but if there is no misfire count the pulse is not adjusted. The pulse width, however determined, is reduced by the width of the first pulse already injected <78> and if the result is greater than zero it is used as the second pulse width <80>. When the second pulse is injected into the current cylinder, the first pulse of the next cylinder is simultaneously injected. A fraction of the cranking fuel pulse is used as the first injection to the next cylinder <82>. Finally the calculated pulse width is sent to the injector drivers <84> and the program returns to START It will thus be seen that the cylinder speed information gathered during the combustion period of the current cylinder is used to determine the second pulse injected one crankshaft revolution later during the intake period.

The description of the preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. The method of detecting misfire in an internal combustion engine during start up comprising the steps of:
    sensing first engine speeds at positions midway between top dead center positions and second engine speeds at positions between each midway position and the previous top dead center position,
    during initial cranking, storing first speeds as cranking speed, and
    comparing the first speed with the second speed during the combustion period of each cylinder and with the cranking speed whereby a failure to increase speed over the cranking speed and over the second speed denotes misfire for that cylinder.

2. The invention as defined in claim 1 including generating reference pulses at crankshaft positions representing top dead center positions and at least two intermediate positions, and measuring the average speed between pulses to derive the first and second engine speeds.

3. The invention as defined in claim 1 including counting misfires for each cylinder and resetting the count when combustion occurs in a given cylinder.

4. The method of controlling fuel during engine cranking on the basis of misfire information comprising the steps of:
    sensing first engine speeds at positions midway between top dead center positions and second engine speeds at positions between each midway position and the previous top dead center position,
    during initial cranking, storing first speeds as cranking speed,
    comparing the first speed with the second speed during the combustion period of each cylinder and with the cranking speed whereby a failure to increase speed over the cranking speed and over the second speed denotes misfire for that cylinder while a speed increase denotes combustion for that cylinder,
    measuring manifold pressure,
    calculating a fuel injection amount for each cylinder from the measured pressure and engine speed, and
    adjusting the fuel amount in response to the misfire history of the cylinder.

5. The invention as defined in claim 4 including providing a standard cranking fuel amount, and
    selecting from the standard fuel amount and the calculated fuel amount on the basis of the combustion history of the cylinder.

6. The invention as defined in claim 4 including providing a standard cranking fuel amount,
    counting the combustion events and the misfires for each cylinder,
    selecting the standard fuel amount when no combustion event has been counted for a cylinder and the calculated amount when a combustion event has been noted, and
    reducing the selected fuel amount for a cylinder in accordance with the number of misfires counted for that cylinder.

7. The invention as defined in claim 4 including injecting the fuel into each cylinder in two portions, the first portion being injected during the exhaust stroke of the cylinder and the second portion being injected during the intake stroke, and
    adjusting the amount of the second portion according to the combustion and misfire history of the cylinder.

* * * * *